US008406208B2

(12) United States Patent
Nakajima

(10) Patent No.: US 8,406,208 B2
(45) Date of Patent: Mar. 26, 2013

(54) COMMUNICATION APPARATUS AND METHOD OF CONSTRUCTING NETWORK THEREBY

(75) Inventor: Takafumi Nakajima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/863,984

(22) PCT Filed: Mar. 4, 2009

(86) PCT No.: PCT/JP2009/054595
§ 371 (c)(1),
(2), (4) Date: Jul. 21, 2010

(87) PCT Pub. No.: WO2009/113556
PCT Pub. Date: Sep. 17, 2009

(65) Prior Publication Data
US 2010/0296455 A1    Nov. 25, 2010

(30) Foreign Application Priority Data

Mar. 14, 2008 (JP) .................. 2008-066734

(51) Int. Cl.
*H04W 4/00* (2009.01)
*H04L 12/56* (2006.01)
*G06F 15/173* (2006.01)
*G06F 15/16* (2006.01)

(52) U.S. Cl. ..... 370/338; 370/328; 370/329; 370/395.2; 455/435.1; 709/225; 709/229

(58) Field of Classification Search ....... 370/328–395.2; 455/230–456.2; 726/2–17; 709/204–229
See application file for complete search history.

(56) References Cited

U.S. PATENT DOCUMENTS

| 6,014,406 | A | 1/2000 | Shida et al. |
| 6,715,071 | B2 | 3/2004 | Ono et al. |
| 7,028,097 | B2 * | 4/2006 | Bard ............................ 709/232 |
| 2003/0169697 | A1 | 9/2003 | Suzuki et al. |
| 2005/0073979 | A1 | 4/2005 | Barber et al. |
| 2007/0297347 | A1* | 12/2007 | Ikeda ............................ 370/254 |
| 2010/0020777 | A1 | 1/2010 | Nakajima |

FOREIGN PATENT DOCUMENTS

| JP | 8-298687 A | 11/1996 |
| WO | 01/62026 A1 | 8/2001 |

OTHER PUBLICATIONS

U.S. Appl. No. 12/811,824, filed Jul. 6, 2010. Applicant: Takafumi Nakajima.

* cited by examiner

*Primary Examiner* — Afsar M. Qureshi
(74) *Attorney, Agent, or Firm* — Fitzpatrick, Cella, Harper & Scinto

(57) ABSTRACT

When a connection is made to a wireless network constructed by a base station, a request to construct a wireless network in which a wireless communication apparatus operates as a base station is sensed and a determination is made as to whether communication is in progress with a communication apparatus of a network different from the wireless network constructed by the base station. If the request to construct the wireless network is sensed and it is determined that communication is in progress with a communication apparatus of a network different from the wireless network in which the base station is the intermediary, then an attempt is made to construct a wireless network in which the wireless communication apparatus operates as a base station.

8 Claims, 15 Drawing Sheets

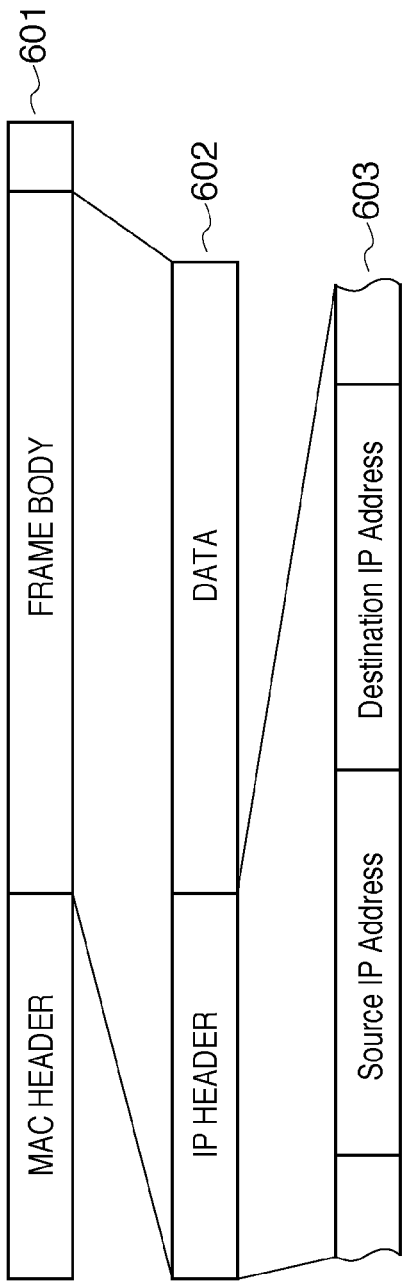

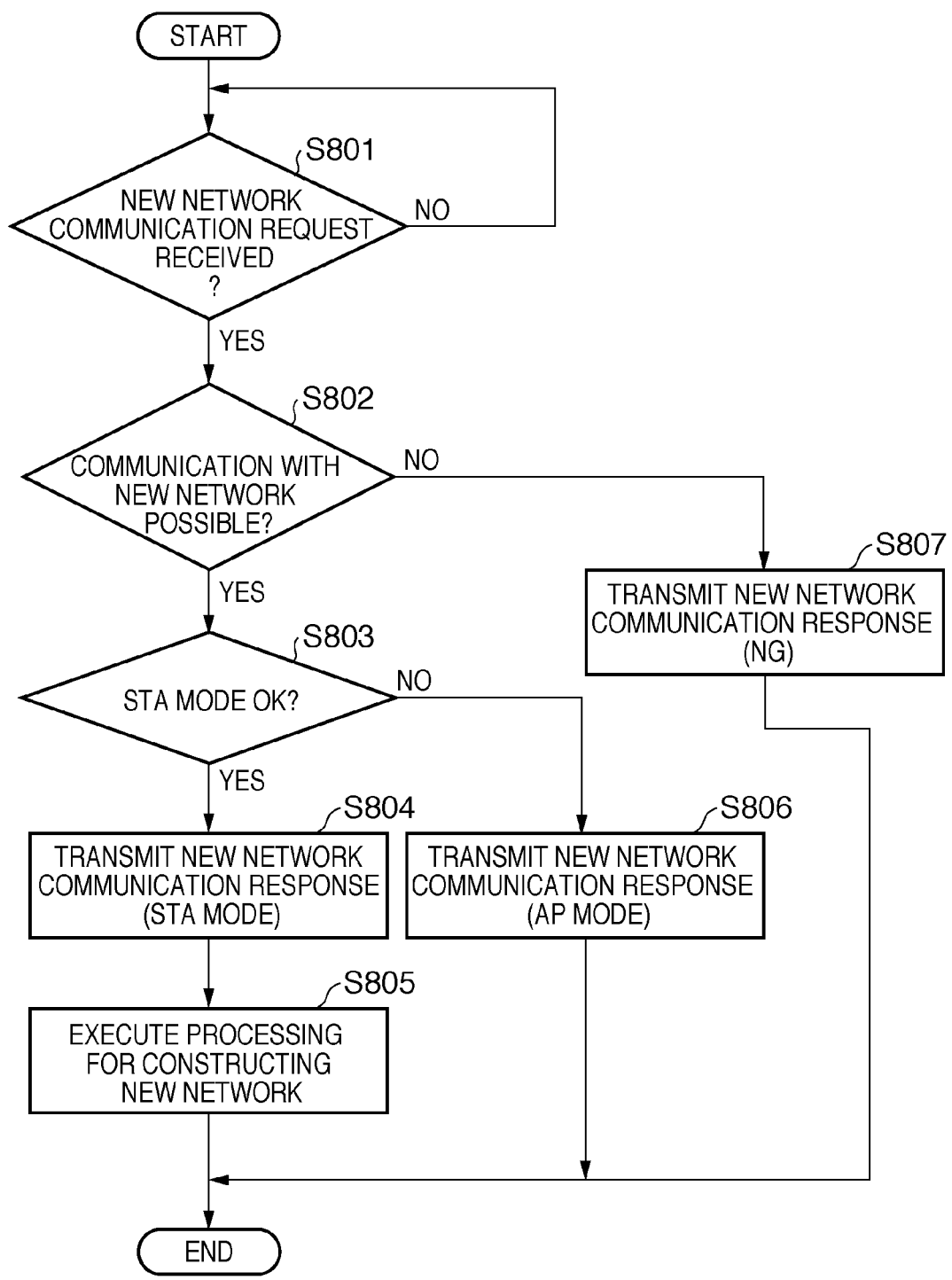

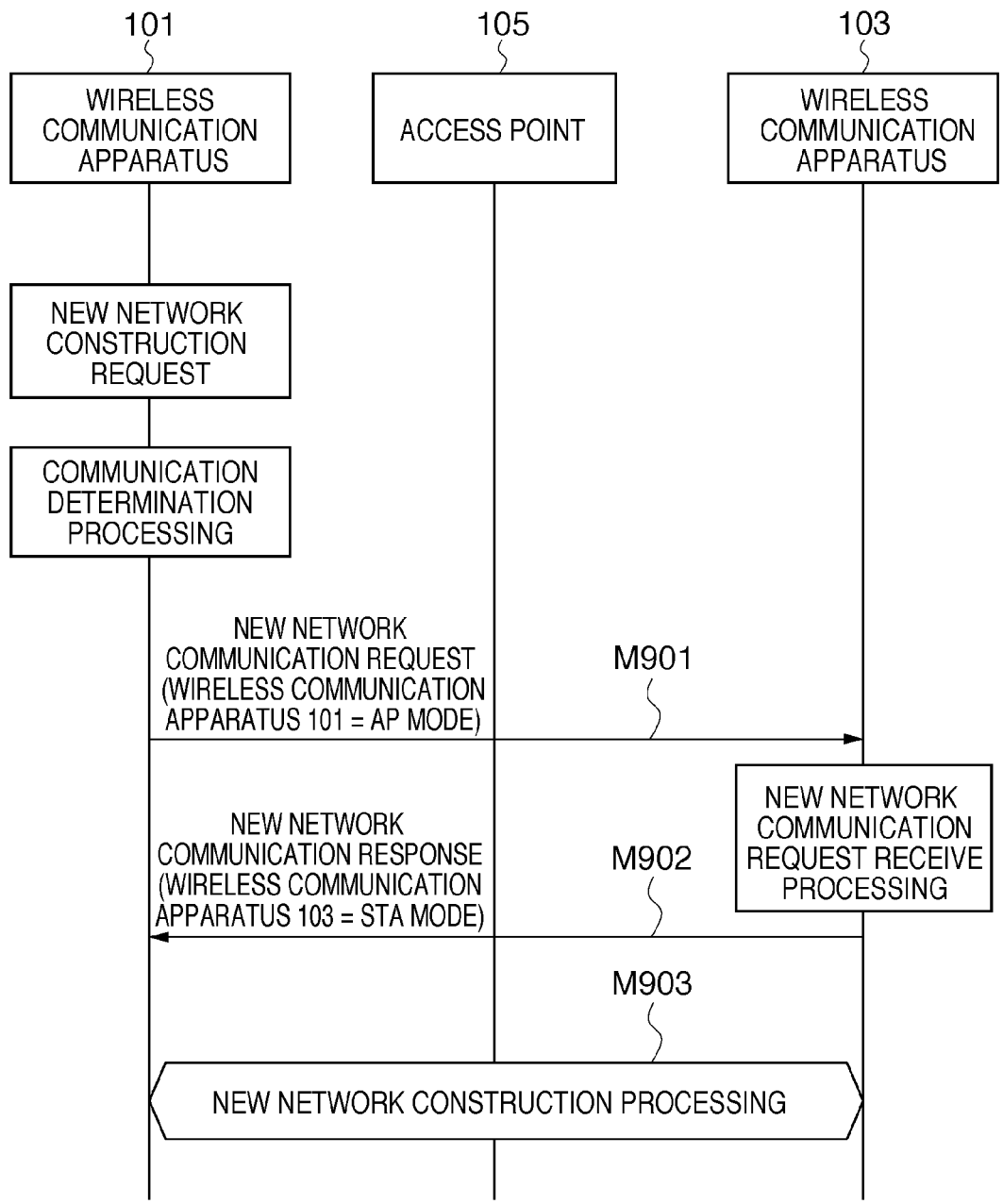

F I G. 14

| COMMUNICATION APPARATUS | IP ADDRESS | MAC ADDRESS |
|---|---|---|
| WIRELESS COMMUNICATION APPARATUS 101 | 192.168.1.12/24 | 00:01:02:03:04:11 |
| WIRELESS COMMUNICATION APPARATUS 103 | 192.168.1.13/24 | 00:01:02:03:04:22 |
| ACCESS POINT 1204 | 192.168.1.20/24 | 00:05:06:07:08:09 |
| ACCESS POINT 1202 | 192.168.1.30/24 | 00:05:06:07:08:10 |
| WIRELESS TERMINAL 1201 | 192.168.1.31/24 | 00:0A:0B:0C:0D:0E |

COMMUNICATION APPARATUS AND METHOD OF CONSTRUCTING NETWORK THEREBY

This application is a National Stage application under 35 U.S.C. §371 of International Application No. PCT/JP2009/054595, filed on Mar. 4, 2009, which claims priority to Japanese Application No. 2008-066734, filed on Mar. 14, 2008, the contents of each of the foregoing applications being incorporated by reference herein.

TECHNICAL FIELD

The present invention relates to a communication apparatus capable of operating as a base station and to a method of constructing a network by this communication apparatus.

BACKGROUND ART

Systems in which communication is performed using a wireless LAN compliant with IEEE 802.11 have proliferated in recent years. Communication apparatuses that communicate by wireless LAN are classified into stations that operate as terminal stations and access points that serve as base stations. Communication by wireless LAN can take on two forms, namely an infrastructure mode in which a station performs communication via an access point, and an ad-hoc mode in which stations communicate with one another directly without the intermediary of an access point. Furthermore, a WDS (Wireless Distribution System) is also available as a mode used in communication among access points.

Furthermore, in a technique that has been proposed, a wireless communication apparatus has a function (an STA mode) in which it operates as a station and a function (AP mode) in which it operates as an access point, with operation being switched between these modes depending upon application and conditions.

In another proposed technique, a wireless communication apparatus (a dual terminal) capable of operating in both the STA and AP modes transitions to the AP mode automatically in accordance with the surrounding circumstances and constructs a communication network automatically (e.g., see the specification of Japanese Patent Laid-Open No. 08-298687).

However, in an environment in which a plurality of dual terminals exist, there is the danger that bandwidth will be wasted when one dual terminal constructs a new network in the AP mode. In other words, when it is considered that data communication with the already existing network is to be allowed to continue, it is necessary that the dual terminal in the AP mode be selected appropriately. For example, consider a network system composed of an access point 105, a wireless communication apparatus 101 and a wireless communication apparatus 103, which are dual terminals, and a wired terminal 107, as illustrated in FIG. 1.

The access point 105 and wired terminal 107 are connected by a wired LAN 108, as shown in FIG. 1. The wireless communication apparatus 101 is connected to the access point 105 in the STA mode and performs data communication with the wired terminal 107. The wireless communication apparatus 103 is connected to the access point 105 in the STA mode. Now assume that when communication between the wireless communication apparatus 101 and wireless communication apparatus 103 starts, a bandwidth inadequacy occurs, by way of example.

In this case, it can be construed that either the wireless communication apparatus 101 or wireless communication apparatus 103 will shift to the AP mode and construct a new network, whereby communication bandwidth between the wireless communication apparatus 101 and wireless communication apparatus 103 will be assured.

However, in a case where the wireless communication apparatus 101 wishes to continue communicating with the wired terminal 107, continuation of communication between the wireless communication apparatus 101 and wired terminal 107 will not be assured if the wireless communication apparatus 103 constructs a network anew in the AP mode, as illustrated in FIG. 16.

Further, because it becomes necessary to carry out transfers to the wireless communication apparatus 101 via the wireless communication apparatus 103, there is an increase in the number of communication paths from the wireless communication apparatus 103 to the wireless communication apparatus 101 and wasting of wireless communication bandwidth occurs.

DISCLOSURE OF INVENTION

The present invention seeks to construct a new network without wasting communication bandwidth.

In accordance with an aspect of the present invention, there is provided a communication apparatus comprising: determination means for determining whether communication is in progress with another communication apparatus of another network different from a network constructed by a base station; and construction means for operating as a base station and trying to construct a new network in a case where a new network is constructed during communication with the other communication apparatus via the base station.

In accordance with an aspect of the present invention, there is provided a method of constructing a network by a communication apparatus, comprising: a determination step of determining whether communication is in progress with another communication apparatus of another network different from a network constructed by a base station; and a construction step of operating as a base station and trying to construct a new network in a case where a new network is constructed during communication with the other communication apparatus via the base station.

Further features of the present invention will become apparent from the following description of exemplary embodiments with reference to the attached drawings.

BRIEF DESCRIPTION OF DRAWINGS

FIG. 6 is a diagram illustrating the structure of a wireless frame used in data communication;

FIG. 7 is a diagram illustrating IP addresses of wireless communication apparatuses, an access point and a wired terminal;

FIG. 8 is a flowchart illustrating processing executed on a side that receives a new-network communication request;

FIG. 9 is a diagram illustrating a communication sequence between wireless communication apparatuses via an access point;

FIG. 14 is a diagram illustrating IP addresses and MAC addresses of wireless communication apparatuses, access points and a wireless terminal;

BEST MODE FOR CARRYING OUT THE INVENTION

Preferred embodiments of the present invention will now be described in detail with reference to the drawings.

First Embodiment

Figure 1:
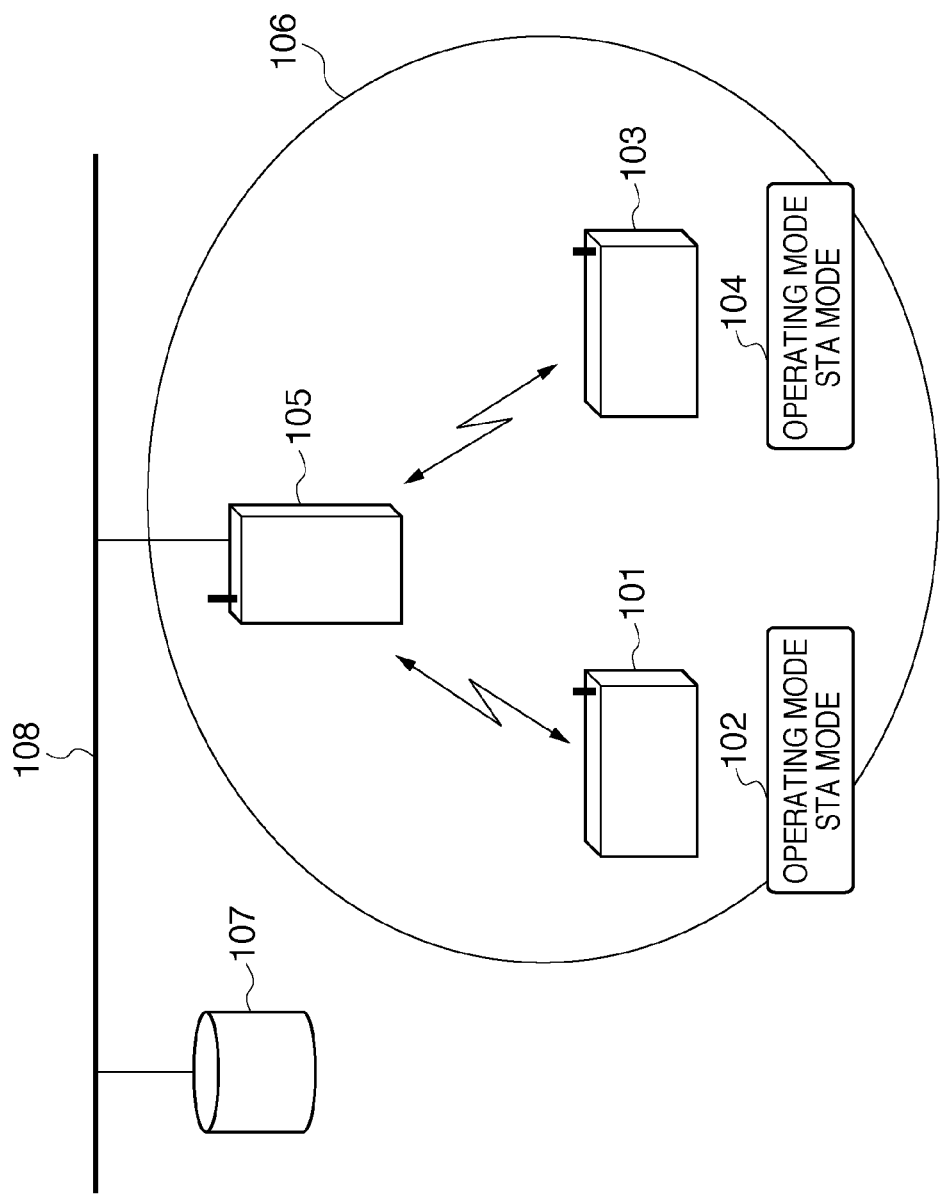
FIG. 1 is a diagram illustrating an example of the configuration of a network system according to a first embodiment of the present invention.

FIG. 1 is a diagram illustrating an example of the configuration of a network system according to a first embodiment of the present invention. The network includes an IEEE 802.11-compliant wireless LAN 106 composed of wireless communication apparatuses 101, 103 and access point 105, and wired LAN 108 to which the access point 105 and wired terminal 107 are connected. The wireless communication apparatus 101 is furnished with a communication function that relies upon the wireless LAN 106 and has, as operating mode 102, an access point mode (referred to as an "AP mode" below) in which the apparatus operates as a base station and a station mode (referred to as an "STA mode" below) in which the apparatus operates as a terminal. Further, the wireless communication apparatus 103 also is furnished with a communication function that relies upon the wireless LAN 106 and has an AP mode and STA mode as operating mode 104.

Figure 2:
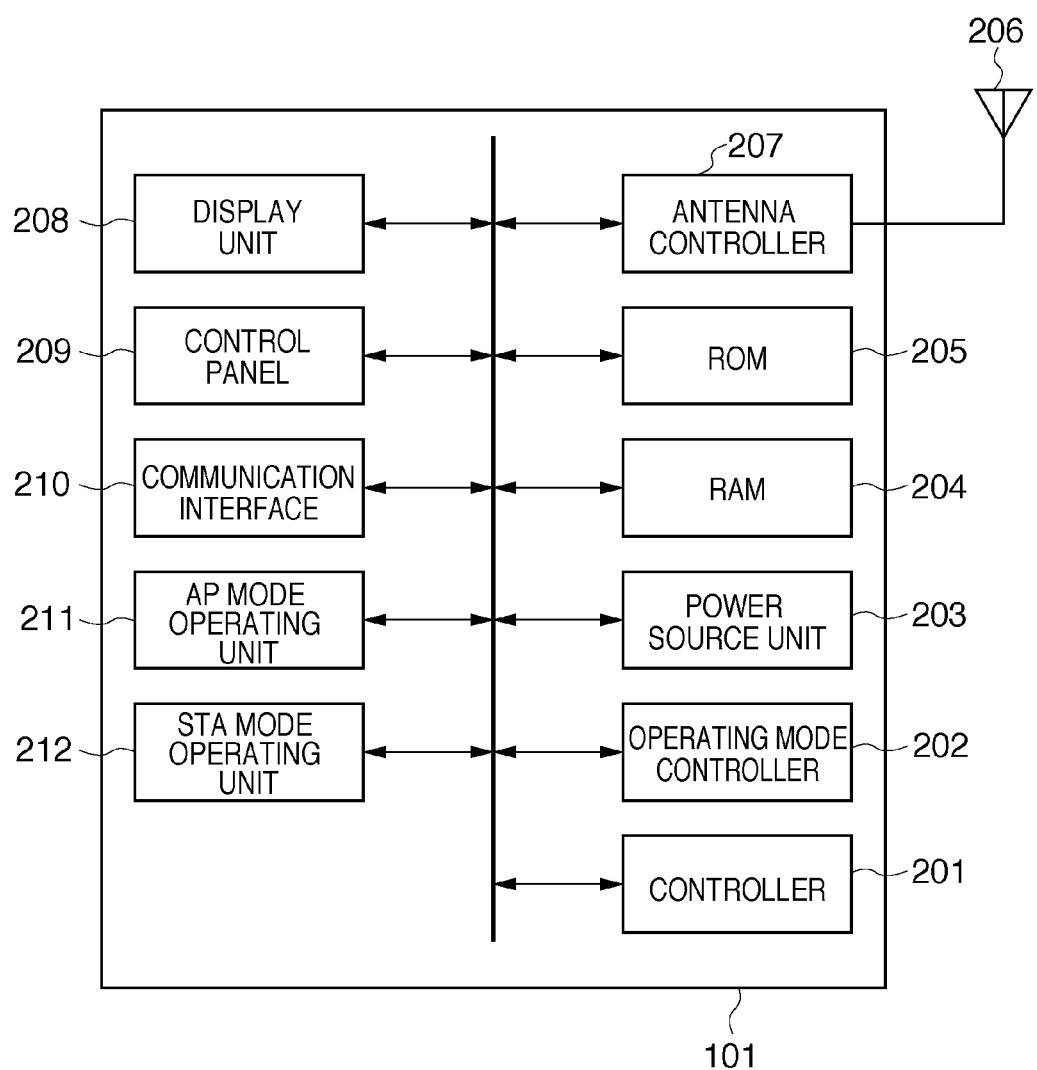
FIG. 2 is a diagram illustrating an example of the configuration of a wireless communication apparatus.

FIG. 2 is a diagram illustrating an example of the configuration of the wireless communication apparatus 101. It should be noted that the configuration of the wireless communication apparatus 103 also is similar to that of the wireless communication apparatus 101. Here the internal configuration of the apparatus will be described taking the wireless communication apparatus 101 as an example.

As shown in FIG. 2, the apparatus includes a controller 201 constituted by a CPU and peripheral circuits (not shown) for controlling the overall wireless communication apparatus 101. An operating mode controller 202 controls the operating mode, described later, and a power source unit 203 is an external power supply or battery, etc. A RAM 204 includes a working area, which is used when control is executed by the controller 201, and various tables, etc. A ROM 205 stores control instructions (programs and control data) of the controller 201. An antenna 206 is for performing wireless communication, and an antenna controller 207 controls wireless communication by the antenna 206.

The wireless communication apparatus 101 further includes a display unit 208 for displaying the operating state, etc., of the apparatus. A control panel 209 is for allowing a user to issue operating instructions to the wireless communication apparatus 101. A communication interface 210 for communication other than wireless is a wired interface typified by USB or IEEE 1394, by way of example. An AP mode operating unit 211 causes the wireless communication apparatus 101 to operate in the AP mode, and an STA mode operating unit 212 causes the wireless communication apparatus 101 to operate in the STA mode.

Figure 3:
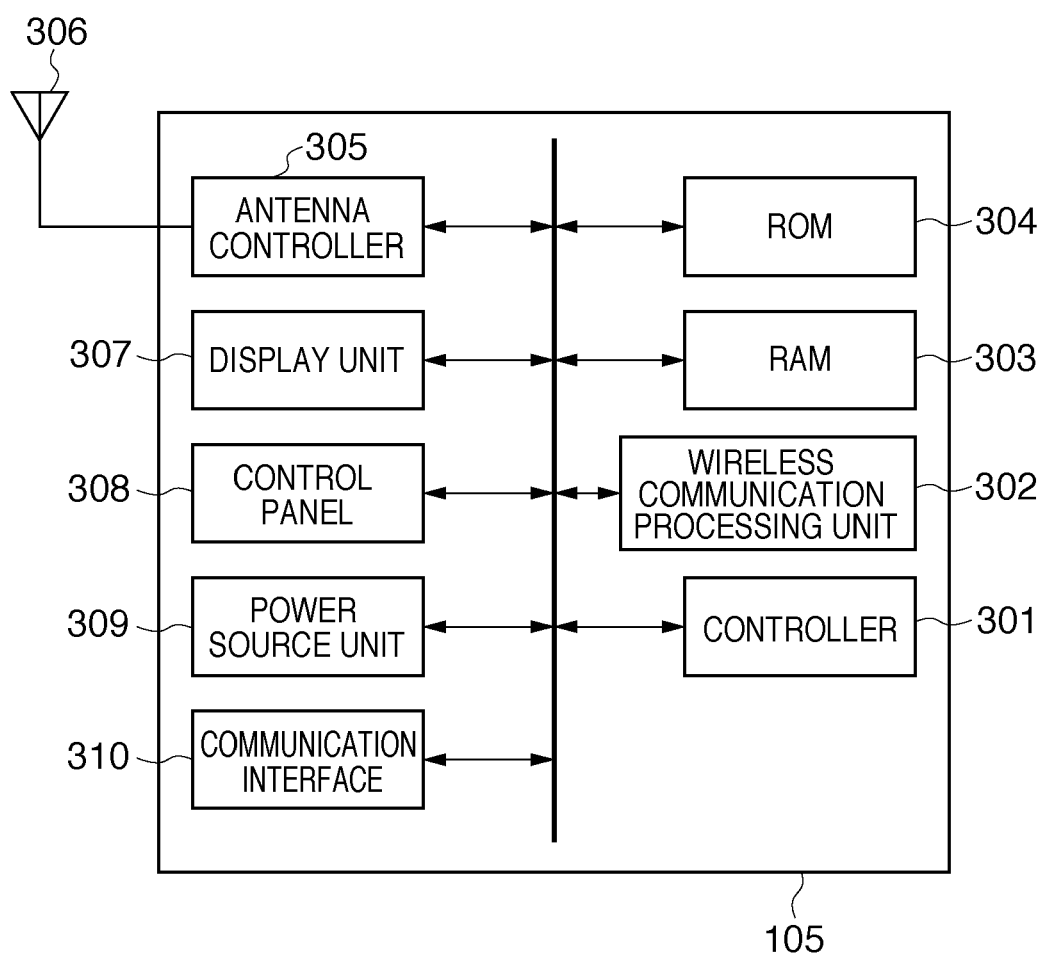
FIG. 3 is a diagram illustrating an example of the configuration of an access point.

FIG. 3 is a diagram illustrating an example of the configuration of the access point 105.

As shown in FIG. 3, the access point 105 includes a controller 301 constituted by a CPU and peripheral circuits (not shown) for controlling the overall access point 105. A wireless communication processing unit 302 controls communication by the wireless LAN 106. A RAM 303 includes a working area, which is used when control is executed by the controller 301, and various tables, etc. A ROM 304 stores control instructions (programs and control data) of the controller 301.

An antenna controller 305 controls wireless communication by an antenna 306, which performs wireless communication. A display unit 307 is for displaying the operating state, etc., of the access point 105. A control panel 308 is for allowing a user to issue operating instructions to the access point 105, and a power source unit 309 is an external power supply or battery, etc., for supplying power to the access point 105. A communication interface 310 is for wirelessly connecting the access point 105 to the LAN to which the wired terminal 107 is connected.

In the arrangement described above, the access point 105 constructs the wireless LAN 106, and the wireless communication apparatuses 101, 103 are connected to the access point 105 owing to actuation of the STA mode operating unit 212. Further, the access point 105 has a router function.

Assume here that data communication of streaming data is being carried out between the wireless communication apparatus 101 and wired terminal 107 via the access point 105. Further, assume that the wireless communication apparatus 103 is connected to the access point 105 but is not performing data communication.

Reference will be made to FIGS. 4 to 11 to describe processing in which the wireless communication apparatus 101 constructs a new network and starts communicating with the wireless communication apparatus 103 in a case where the wireless communication apparatus 103 has requested the wireless communication apparatus 101 to communicate under these conditions.

Figure 4:
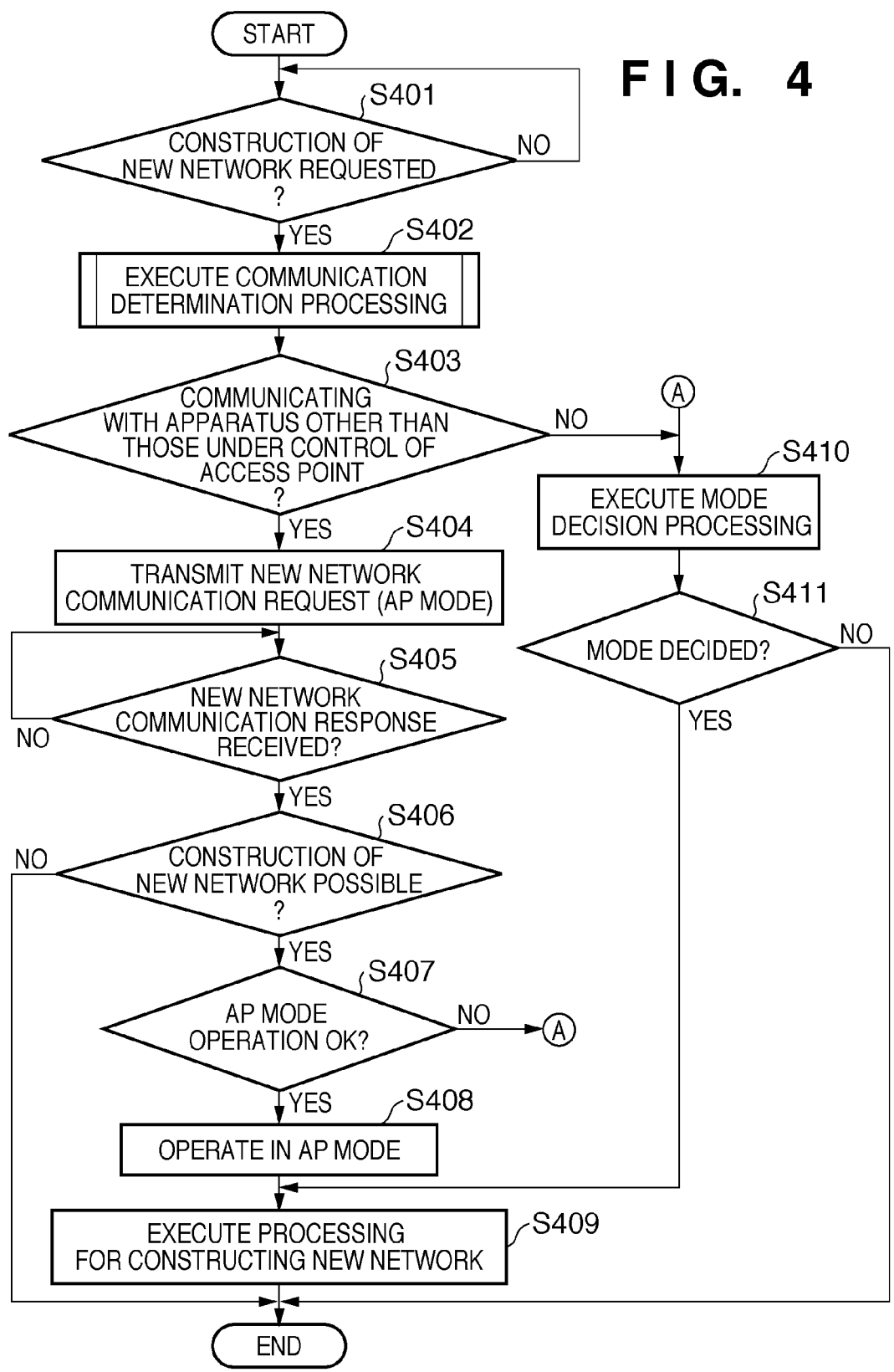
FIG. 4 is a flowchart illustrating processing executed by a wireless communication apparatus when a new network is constructed.

FIG. 4 is a flowchart illustrating processing executed by a wireless communication apparatus when a new network is constructed, FIG. 8 is a flowchart illustrating processing executed on a side that receives a new-network communication request, and FIG. 9 is a diagram illustrating a communication sequence between the wireless communication apparatus 101 and wireless communication apparatus 103 via the access point 105. FIGS. 5 to 7 and FIGS. 10, 11 are diagrams useful in describing communication determination processing. The details will be described later.

In the first embodiment, assume that inadequate bandwidth is detected when the wireless communication apparatus 101 starts communicating with the wireless communication apparatus 103 via the access point 105. Owing to such detection, the wireless communication apparatus 101 determines that it is necessary to construct a new network (S401). It should be noted that the determination as to whether the construction of a new network is required is not limited to detection of inadequate bandwidth. For example, the determination may be made in response to an instruction from the user.

Next, the wireless communication apparatus 101 executes communication determination processing for determining whether it is communicating with an apparatus other than those connected to the existing network constructed by the access point 105 (S402).

Figure 5:
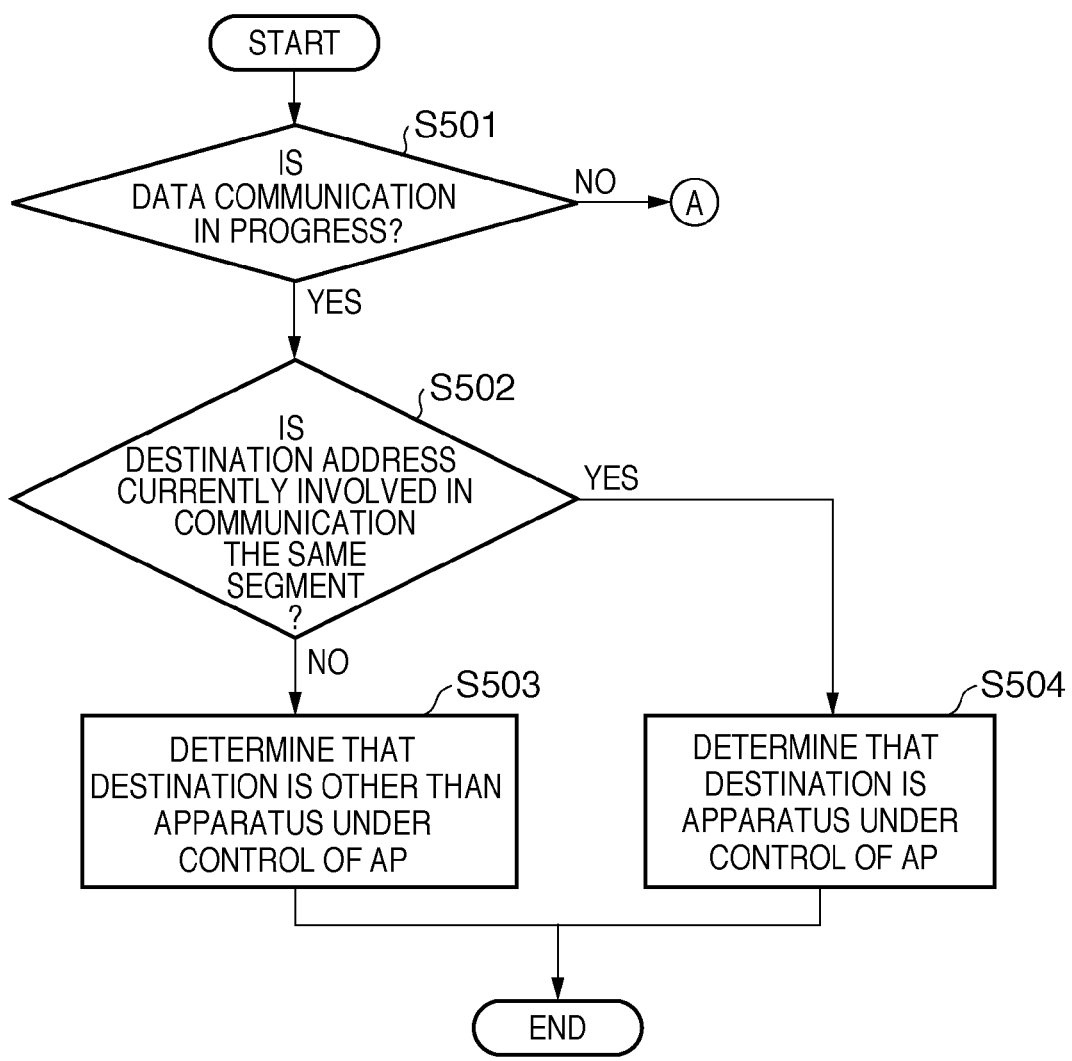
FIG. 5 is a flowchart illustrating communication determination processing according to the first embodiment.

An example of this communication determination processing will be described with reference to FIGS. 5, 6 and 7. FIG. 5 is a flowchart illustrating communication determination processing according to the first embodiment, FIG. 6 is a diagram illustrating the structure of a wireless frame used in data communication, and FIG. 7 is a diagram illustrating IP addresses of the wireless communication apparatuses 101, 103, access point 105 and wired terminal 107.

As shown in FIG. 6, a MAC frame (data frame) 601 is composed of a MAC header and frame body. An IP packet 602 serves as the frame body. A field 603, which is obtained by extracting the IP header portion of the IP packet, indicates the IP address of the transmission source and the IP address of the destination.

In conventional communication, it is possible to ascertain the data transmission source and destination IP addresses from the field 603. In FIG. 7, what follows the "/" of each IP address indicates a subnet mask. Although an IPv4 address is used in the first embodiment, this does not impose any limitation and the address may just as well be an IPv6 address.

In FIG. 5, the wireless communication apparatus 101 determines whether or not data communication is in progress (S501). If it is determined that data communication is in progress, then the wireless communication apparatus 101 checks the data frame, which is currently involved in communication, which it itself transmits. Accordingly, using the destination IP address as well as the IP address and subnet address that have been assigned to this wireless communication apparatus and are shown in FIG. 7, the wireless communication apparatus 101 determines whether the destination IP address is the same segment (S502). As a result of the determination, it is found that the IP address of the wired terminal 107 performing data communication has an IP address and subnet mask different from those of the wireless communication apparatus 101 and therefore it is determined that the destination IP address is not the same segment. The wireless communication apparatus 101 then determines that communication with an apparatus other than apparatuses under the control of the access point 105 exists (S503).

If in the above-described communication determination processing (S402) it is determined that data communication is being performed with an apparatus other than apparatuses under the control of the access point 105 ("YES" in S403), then the wireless communication apparatus 101 places itself in the AP mode and tries to construct a network by operating in the AP mode. The wireless communication apparatus 101 then transmits a new network communication request message M901 (S404) containing an indication that the wireless communication apparatus 101 will switch to the AP mode. The transmission destination is the wireless communication apparatus 103, which is the communication destination when the new network is constructed. The message may be transmitted to the wireless communication apparatus 103 by unicast or broadcast.

On the other hand, when the wireless communication apparatus 103 receives the new network communication request message M901 (S801), it determines whether the communication over the new network is possible (S802). This determination may be made by the user or may be made in accordance with a predetermined policy.

If it is determined that communication over the new network is possible, then, based upon the new network communication request message M901, the wireless communication apparatus 103 interprets that the wireless communication apparatus 101 wishes to operate in the AP mode. The wireless communication apparatus 103 then determines whether it is permissible for this apparatus to operate in the STA mode in the new network (S803). The result of the determination is that the wireless communication apparatus 103 is not performing communication with an apparatus other than those under the control of the access point 105. Therefore, the wireless communication apparatus 103 sends the wireless communication apparatus 101 a new network communication response message M902 containing an indication that participation in the new network is possible in the STA mode.

Further, if communication in the new network is not possible, then the wireless communication apparatus 103 sends the wireless communication apparatus 101 a new network communication response message containing an indication that participation in the new network is not possible in the STA mode (S807). Further, if it is determined in S803 that the wireless communication apparatus 103 cannot operate in the STA mode, then the wireless communication apparatus 103 sends the wireless communication apparatus 101 the new network communication response message containing an indication that it will operate in the AP mode (S806).

Next, upon receiving the new network communication response message M902 ("YES" in S405), the wireless communication apparatus 101 interprets from the message whether the new network is capable of being constructed (S406) and whether it itself may operate in the AP mode (S407). Accordingly, based upon the new network communication response message M902, the wireless communication apparatus 101 determines that it itself is capable of constructing the new network in the AP mode, and the operating mode controller 202 actuates the AP mode operating unit 211 (S408).

Figure 15:
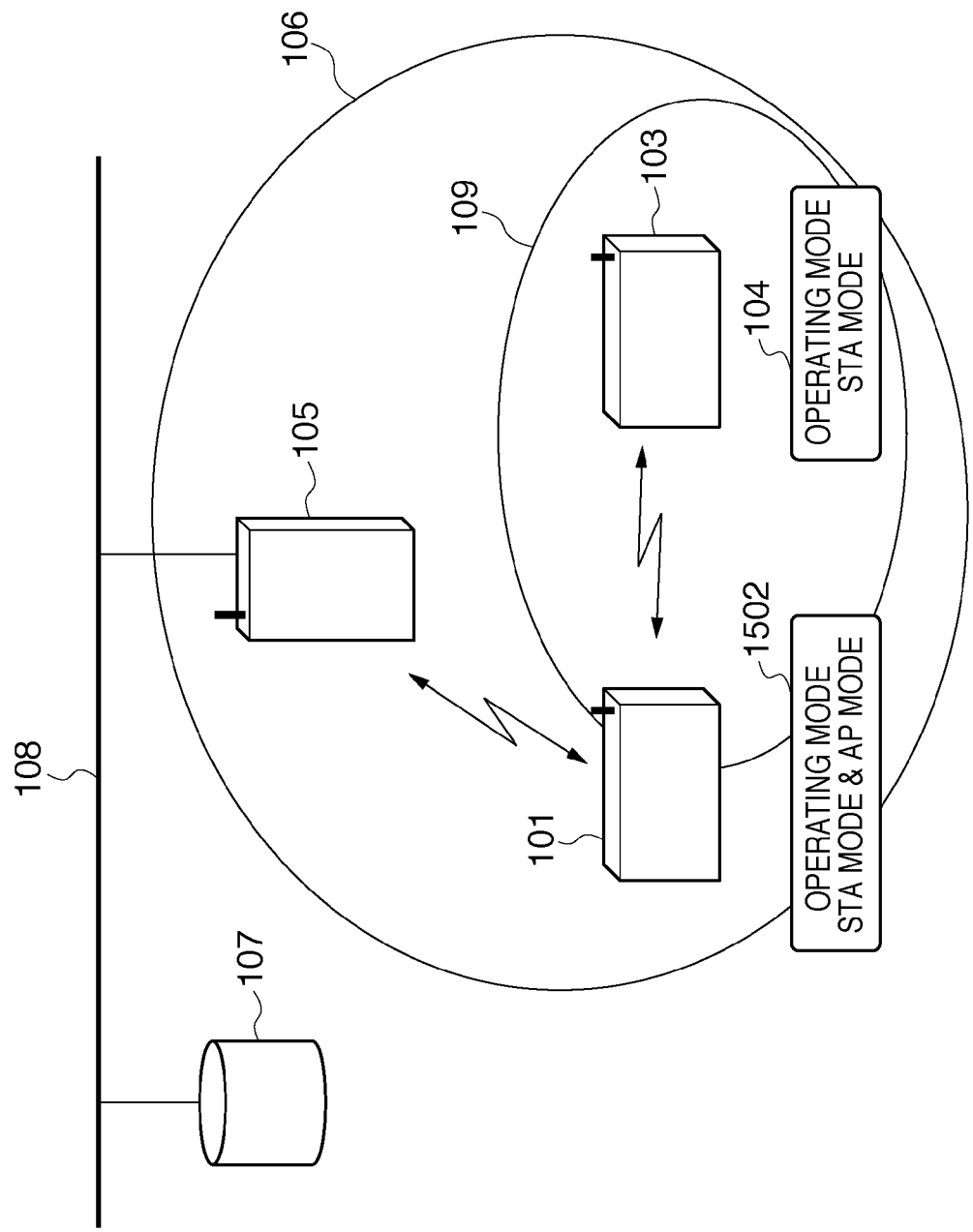
FIG. 15 is a diagram illustrating an example of construction of a new network in the first embodiment.
Figure 16:
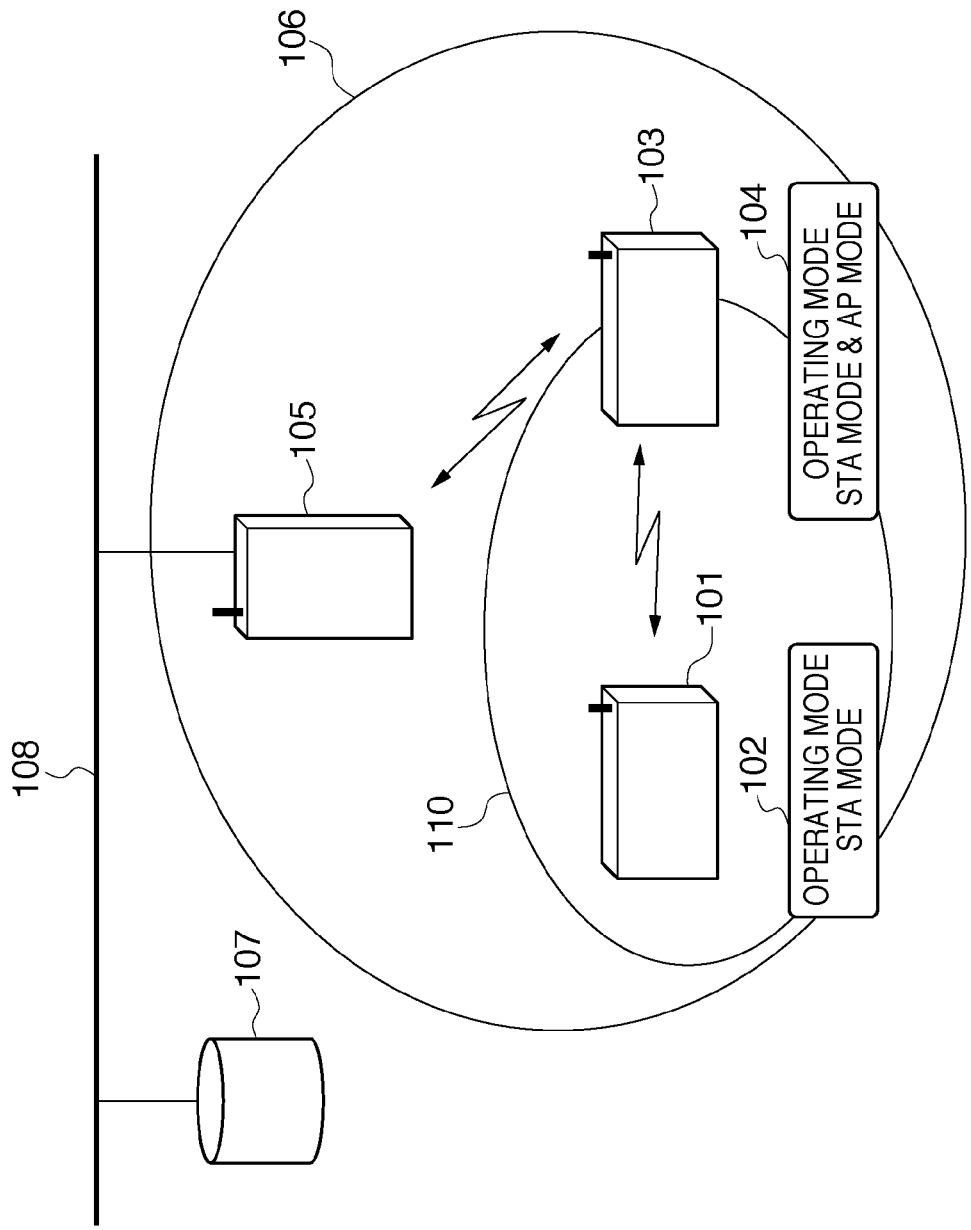
FIG. 16 is a diagram useful in describing a problem that arises with a conventional network system.

Thereafter, new network construction processing M903 is executed by the wireless communication apparatus 101 and wireless communication apparatus 103 via the access point 105. The wireless communication apparatus 101 operates in the AP mode and constructs the new wireless network, and the wireless communication apparatus 103 joins the new wireless network, whereby communication between these two apparatuses becomes possible (see FIG. 15). When it communicates over the new wireless network, the wireless communication apparatus 101 actuates the STA mode operating unit 212 and continues communication with the wired terminal 107 via the access point 105.

It should be noted that the operating mode controller 202 may actuate the STA mode operating unit 212 and AP mode operating unit 211 simultaneously or may actuate them switchingly. Further, the operating mode controller 202 may start up only the AP mode operating unit 211 and connect to the access point 105 using a WDS.

Further, in a case where the wireless communication apparatus 101 determines in S403 that it is not performing data communication with an apparatus other than those under the control of the access point 105, the wireless communication apparatus 101 executes mode decision processing (S410). Similarly, mode decision processing is executed (S410) also in a case where the wireless communication apparatus 103 receives at 5407 an indication of operation in the AP mode. By virtue of mode decision processing, the wireless communication apparatus causes itself to operate in the AP mode or STA mode. The details of this decision processing will not be described here.

If a mode is decided as a result of this decision processing, new network construction processing (S409) is executed.

However, in a case where the mode cannot be decided, processing for constructing a new network is terminated.

Further, in a case where the determination made in the communication determination processing as to whether the wireless communication apparatus 101 is currently communicating (S501) is that data communication is not in progress, similar processing is executed.

[Modification]

Figure 10:
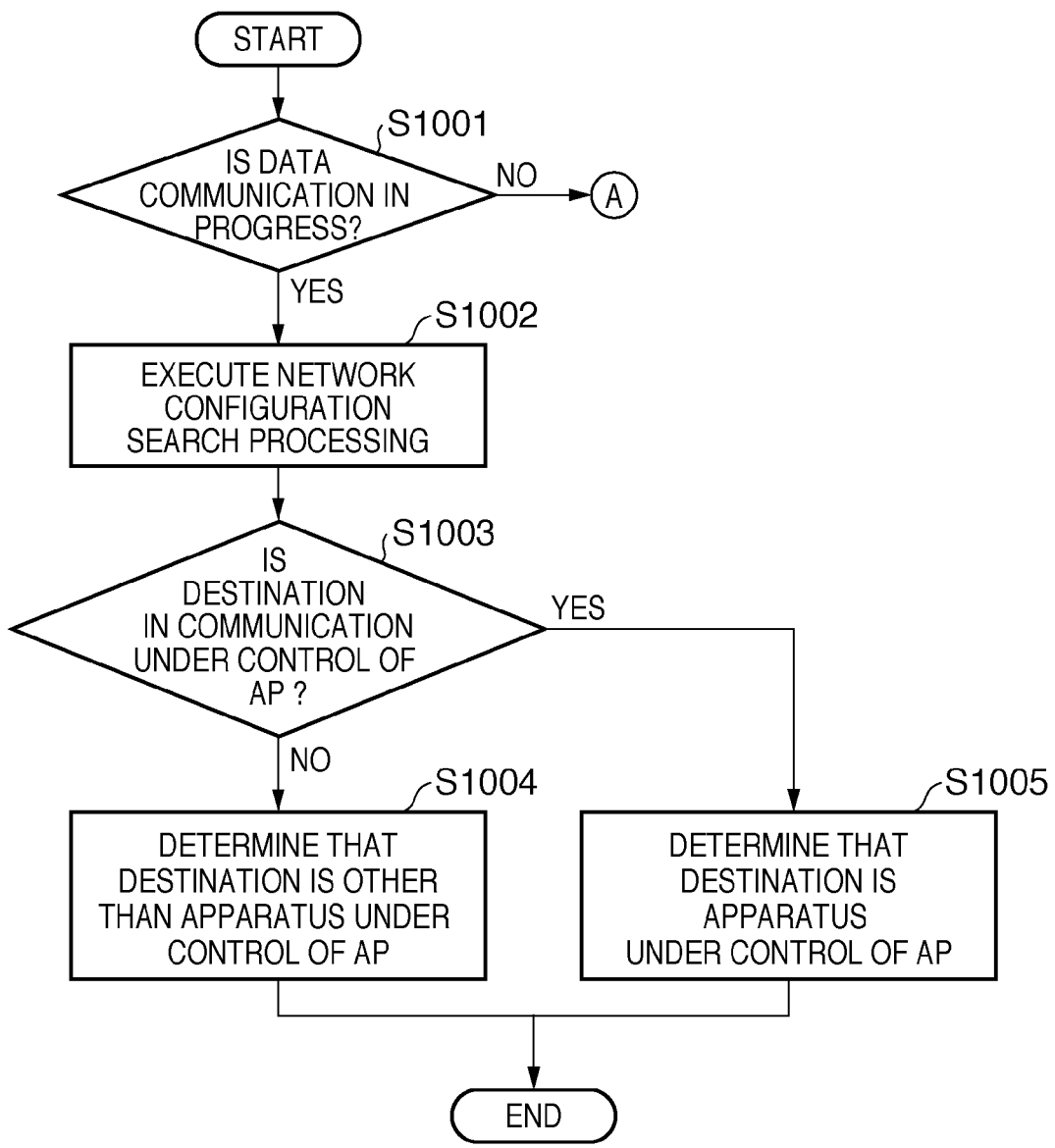
FIG. 10 is a flowchart illustrating communication determination processing according to another method.
Figure 11:
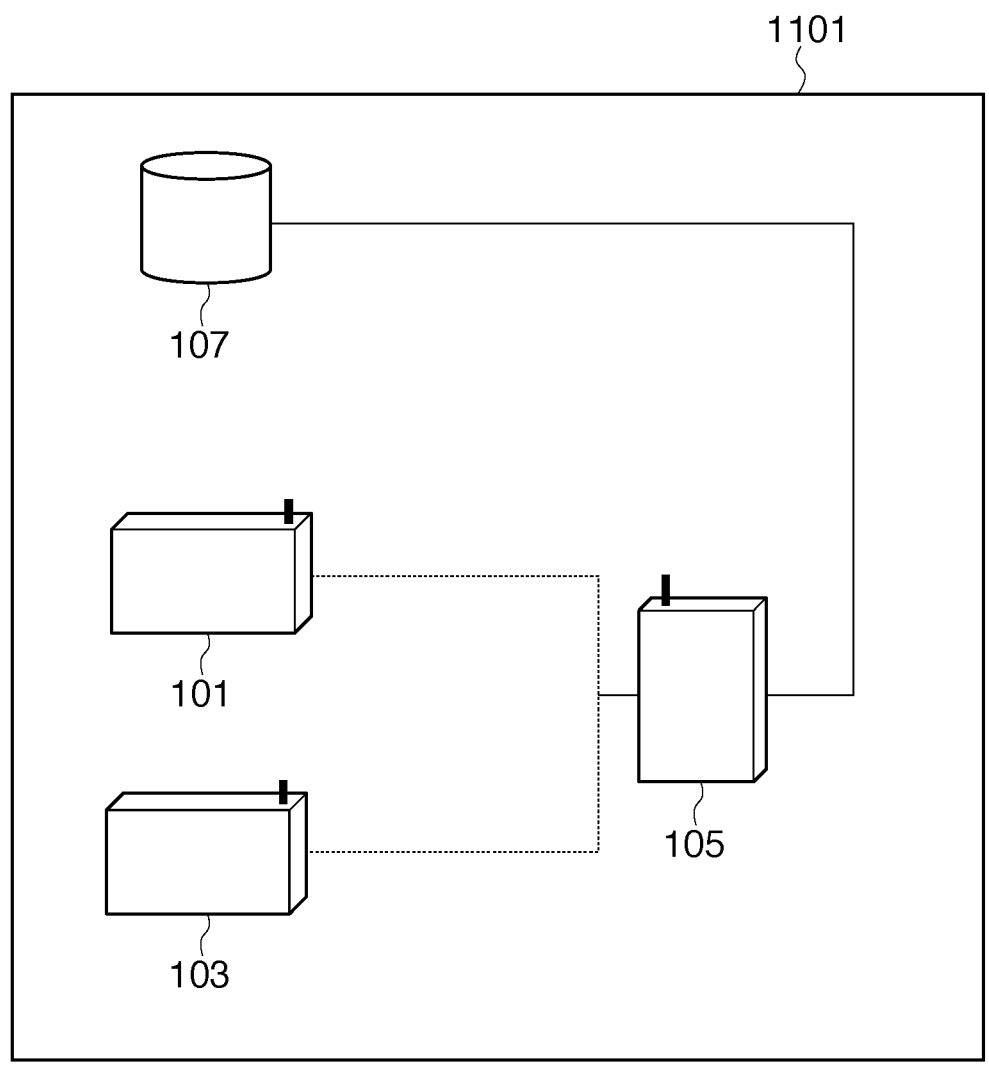
FIG. 11 is a diagram illustrating an example of results of network topology map search processing.

The communication determination processing described above illustrates one example. Another method will now be described. Reference will be made to FIGS. 10 and 11 to describe a method in which use is made of a network topology map in communication determination processing to determine whether data communication is being carried out with an apparatus other than those under the control of the access point 105.

FIG. 10 is a flowchart illustrating communication determination processing according to another method. In FIG. 10, the wireless communication apparatus 101 determines whether data communication is in progress (S1001). If it is determined that data communication is in progress, then the wireless communication apparatus 101 executes processing for searching for a network topology map (S1002). Here a function for searching for a network topology map is implemented by a neighborhood search protocol such as LLTD (Link Layer Topology Discovery).

An example of results of network topology map search processing is illustrated in FIG. 11. It can be determined from these results that the apparatus presently performing data communication is the wired terminal 107. This determination may be made using information concerning the destination of data communication or it may be made based upon device information, etc.

Since the wired terminal 107 is not under the control of the access point 105 ("NO" in S1003), it is determined that data communication with an apparatus other than those under the control of the access point 105 exists (S1004).

In accordance with the first embodiment, it is possible to construct a new network with an arrangement in which communication with an existing network is allowed to continue and bandwidth is not wasted in an environment where a plurality of wireless communication apparatuses having an AP mode and STA mode exist.

Second Embodiment

Next, a second embodiment according to the present invention will be described in detail with reference to the drawings.

Figure 12:
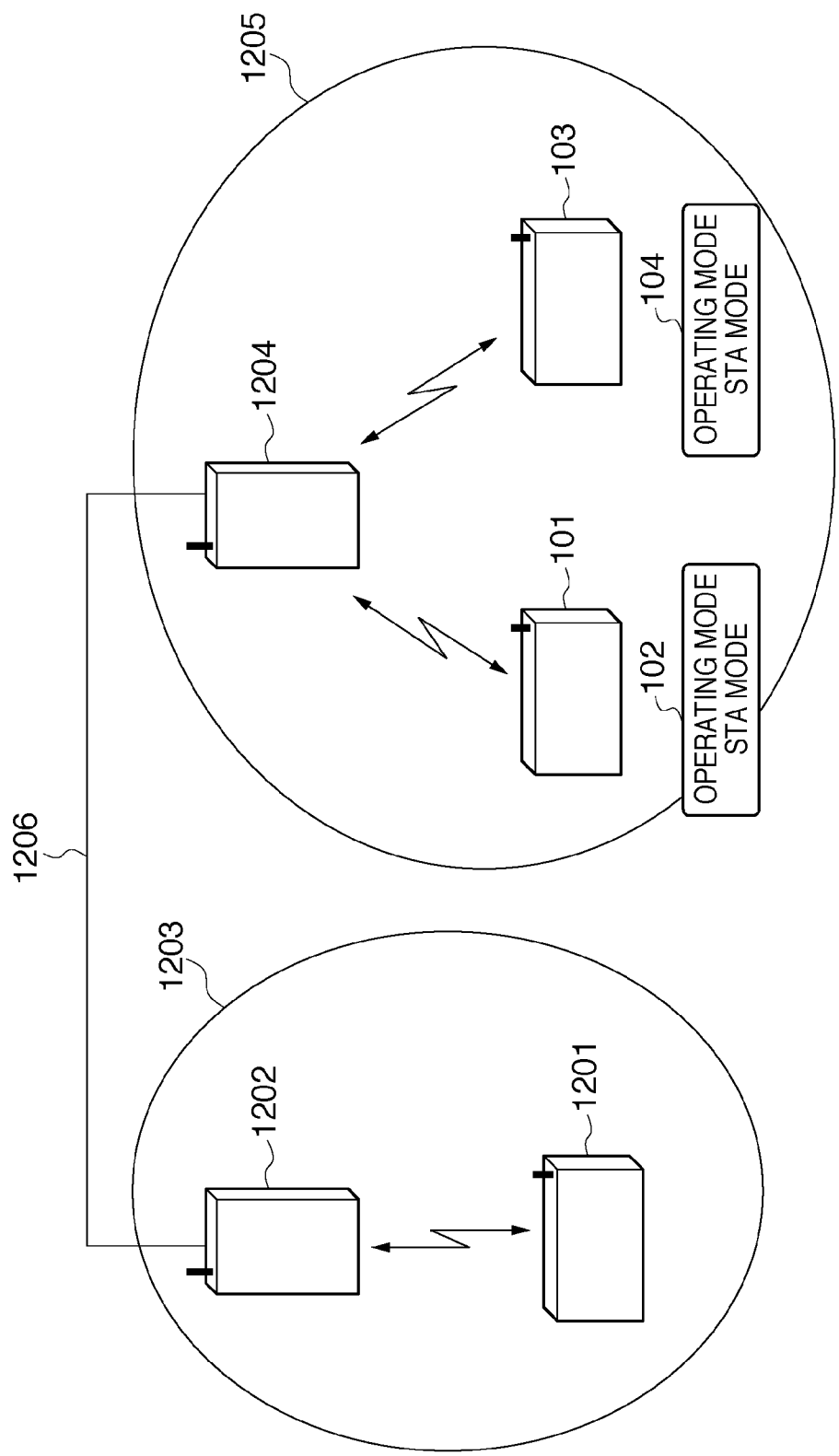
FIG. 12 is a diagram illustrating an example of the configuration of a network system according to a second embodiment of the present invention.

FIG. 12 is a diagram illustrating an example of the configuration of a network system according to the second embodiment. The network shown in FIG. 12 includes a wireless LAN 1203 composed of a wireless terminal 1201 and an access point 1202, and a wireless LAN 1205 composed of wireless communication apparatuses 101, 103 and an access point 1204. It should be noted that the wireless communication apparatuses 101, 103 are identical with the wireless communication apparatuses 101, 103 shown in FIGS. 1 and 2 described in the first embodiment.

The access points 1202 and 1204 each have a bridge function and are connected by a LAN 1206. The network constructed by the access points 1202, 1204 is the same network (same subnet) as the network in the IP layer. Further, the channels of the wireless LANs 1203, 1205 constructed by the access points 1202, 1204 are different.

In the arrangement described above, the wireless communication apparatuses 101, 103, with their STA mode operating units 212 actuated, are both connected to the access point 1204. On the other hand the wireless terminal 1201 is connected to the access point 1202.

It is assumed here that data communication of streaming data is being carried out between the wireless communication apparatus 101 and wireless terminal 1201 via the access points 1204, 1202. Further, the wireless communication apparatus 103 is connected to the access point 1204 but it is assumed that it is not performing data communication.

Processing will be described in which the wireless communication apparatus 103 requests communication with the wireless communication apparatus 101 via the access point 1204 and the wireless communication apparatus 101 constructs a new network and starts communicating in a manner similar to that of the first embodiment.

In the second embodiment, assume that inadequate bandwidth is detected when the wireless communication apparatus 101 starts communicating with the wireless communication apparatus 103 via the access point 1204. Owing to such detection, the wireless communication apparatus 101 determines that it is necessary to construct a new network (S401). It should be noted that the determination as to whether the construction of a new network is required is not limited to detection of inadequate bandwidth. For example, the determination may be made in response to an instruction from the user.

Next, the wireless communication apparatus 101 executes communication determination processing for determining whether it is communicating with an apparatus other than those connected under the access point 1204 (S402).

Figure 13:
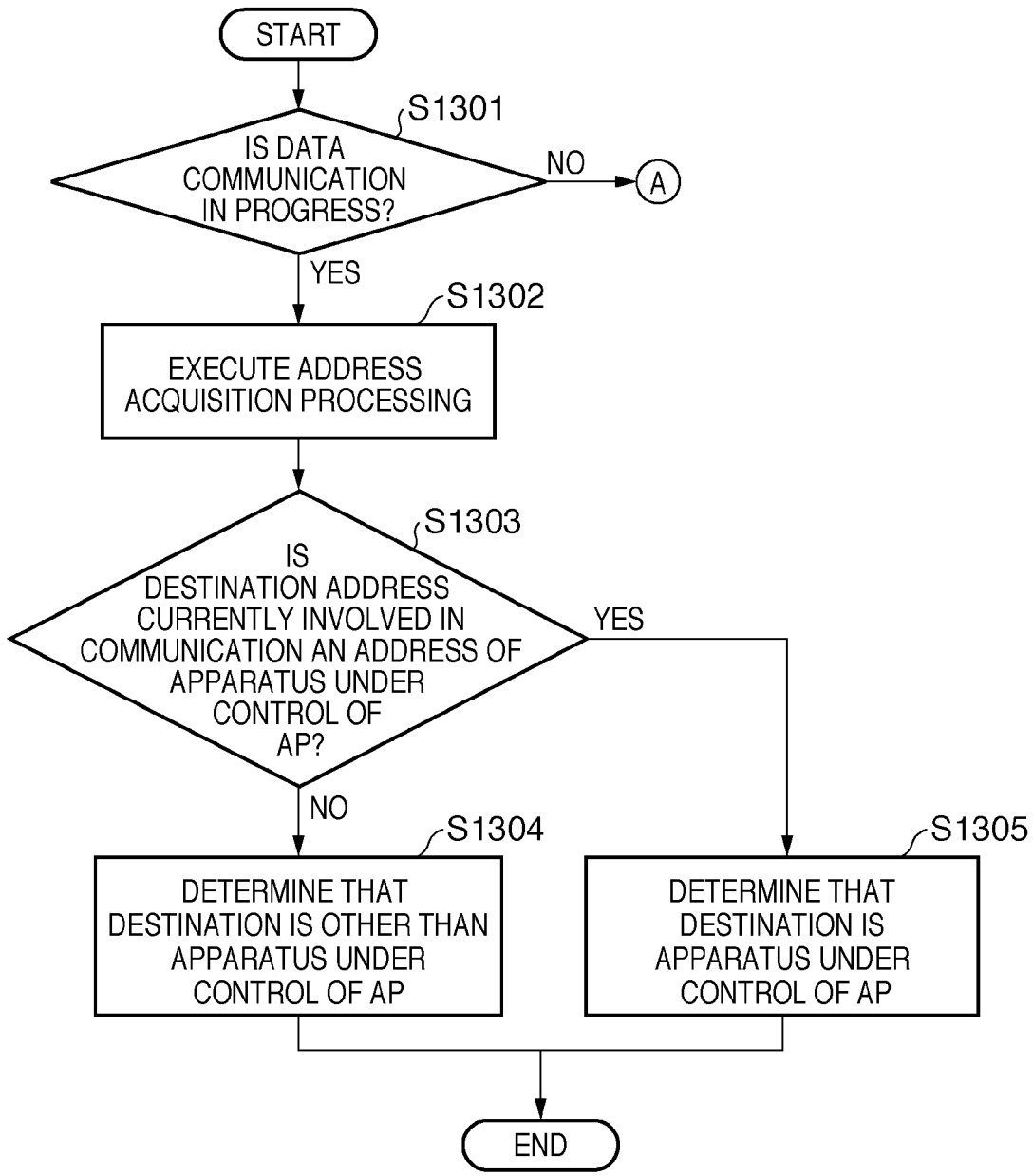
FIG. 13 is a flowchart illustrating communication determination processing according to the second embodiment.

An example of this communication determination processing will be described with reference to FIGS. 13 and 14. FIG. 13 is a flowchart illustrating communication determination processing according to the second embodiment, and FIG. 14 is a diagram illustrating IP addresses and MAC addresses of the wireless communication apparatuses 101, 103, access points 1204, 1202 and wireless terminal 1201.

First, as communication determination processing, the wireless communication apparatus 101 determines whether it itself is currently communicating (S1301). As a result, since the wireless communication apparatus 101 is performing streaming data communication with the wireless terminal 1201 via the access points 1204, 1202, it is determined that data communication is in progress. The wireless communication apparatus 101 thus determined to be performing data communication acquires the MAC addresses of terminals connected under the access point 1204 (S1302). This acquisition of addresses may be performed for both MAC addresses and IP addresses.

A method of acquiring addresses is to provide the access point 1204 with a function for gathering the MAC addresses of terminals connected to the access point 1204 and the MAC address of the access point 1204 and deliver the addresses in the form of a list in response to a request from the wireless communication apparatus 101.

Further, the wireless communication apparatus 101 may be set to a promiscuous mode and all packets of the wireless LAN 1205 constructed by the access point 1204 may be received and the MAC addresses acquired.

Next, the wireless communication apparatus 101 compares the acquired MAC addresses and the MAC address of the destination with which data communication is currently being performed (S1303). As a result, it is determined that a MAC address identical with the MAC address of the destination (wireless terminal 1201) currently performing communication is not included among the acquired MAC addresses. That is, since it is ascertained that the destination currently performing data communication is that of an apparatus other than those under the control of the access point 1204, it is determined that communication with an apparatus other than those under the control of the access point 1204 exists (S1304).

Processing executed by the wireless communication apparatuses 101 and 103 from this point onward is identical with that of FIGS. 4 and 8 described in the first embodiment and need not be described again.

As a result, the wireless communication apparatus 101 constructs a new network in the AP mode and the wireless communication apparatus 103 joins the new network, whereby communication between these two apparatuses becomes possible. Further, the wireless communication apparatus 101 is capable of continuing data communication with the wireless terminal 1201 via the access points 1204, 1202.

In accordance with the second embodiment, even with an identical subnet in the IP layer in terms of the network configuration, whether or not communication is being performed with an apparatus other than those connected under an access point can be determined.

The communication determination processing described in the first and second embodiments may be implemented independently or implemented in combination.

Further, the processing executed by the wireless communication apparatuses 101 and 103 in the first and second embodiments is not limited to each apparatus and can be executed by both apparatuses mutually.

Thus, as described above, in an environment where a plurality of wireless communication apparatuses having both an AP mode and an STA mode exist, communication with an existing network is allowed to continue and one of the wireless communication apparatuses constructs a new network in the AP mode. As a result, it is possible to construct a new network without wasting communication bandwidth.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes per se read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, not only are the functions of the above-described embodiments implemented by executing program code that has been read by a computer; the following case is included as well: specifically, an operating system or the like running on the computer executes some or all of the actual processing based upon the indications in the program codes, and the functions of the above-described embodiments are implemented by this processing.

Furthermore, it goes without saying that the following case also is included in the present invention: specifically, program code read from a recording medium is written to a memory provided on a function expansion board inserted into the computer or provided in a function expansion unit connected to the computer. Thereafter, a CPU or the like provided on the function expansion board or function expansion unit performs some or all of actual processing based upon the indication in the program codes, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-066734, filed Mar. 14, 2008, which is hereby incorporated by reference herein in its entirety.

The invention claimed is:

1. A first communication apparatus comprising:
   a connection unit that connects to a first network constructed by a base station;
   a first determination unit that determines whether or not communication is in progress with a second communication apparatus other than apparatuses under the control of the base station, via the base station after connecting to the first network by the connection unit;
   a second determination unit that determines whether to operate as a base station of a second network or to operate as a station connected to the base station of the second network; and
   a construction unit that operates as the base station of the second network while maintaining the connection with the first network to construct the second network in a case where it is determined to operate as the base station of the second network by the second determination unit,
   wherein it is determined to operate as the base station of the second network by the second determination unit and the construction unit tries to construct the second network as the base station while maintaining the connection with the first network, in a case where it is determined that communication is in progress with the second communication apparatus by the first determination unit when the first communication apparatus communicates with a third communication apparatus connected to the first network.

2. The apparatus according to claim 1, wherein the first determination unit determines whether or not the first communication apparatus is communicating with the second communication apparatus based upon a destination address of data.

3. The apparatus according to claim 1, wherein the first determination unit determines that the first communication apparatus is communicating with the second communication apparatus, if a destination address of data is not the same segment as the first communication apparatus.

4. The apparatus according to claim 3, wherein the address is an IP address and whether the segment is the same segment is decided by using a subnet mask.

5. The apparatus according to claim 1, wherein the first determination unit determines whether or not the first communication apparatus is communicating with the second communication apparatus based upon network topology.

6. The apparatus according to claim 1, wherein said construction unit transmits a message indicating that the first communication apparatus operates as a base station to the first network, and constructs the second network as the base station in accordance with a response to the message.

7. A method of constructing a network by a first communication apparatus, comprising:

a connection step of connecting to a first network constructed by a base station;

a first determination step of determining whether or not communication is in progress with a second communication apparatus other than apparatuses under the control of the base station, via the base station after connecting to the first network in the connection step;

a second determination step of determining whether to operate as a base station of a second network or to operate as a station connected to the base station of the second network; and a construction step of operating as the base station of the second network while maintaining the connection with the first network to construct the second network in a case where it is determined to operate as the base station of the second network in the second determination step, wherein it is determined to operate as the base station of the second network in the second determination step and the first communication apparatus tries to construct the second network as the base station in the construction step while maintaining the connection with the first network, in a case where it is determined that communication is in progress with the second communication apparatus in the first determination step when the first communication apparatus communicates with a third communication apparatus connected to the first network.

8. A non-transitory computer-readable recording medium on which a program for causing a computer to execute a method of constructing a network by a first communication apparatus set forth in claim 7 has been recorded.

* * * * *